Dec. 9, 1969  B. A. YOUNG  3,483,092
RECOVERY OF A VOLATILE ORGANIC SOLVENT BY DISTILLATION
WITH SOLVENT FEED FLOW RESPONSIVE TO
STILL TEMPERATURE
Filed Dec. 19, 1966  6 Sheets-Sheet 1
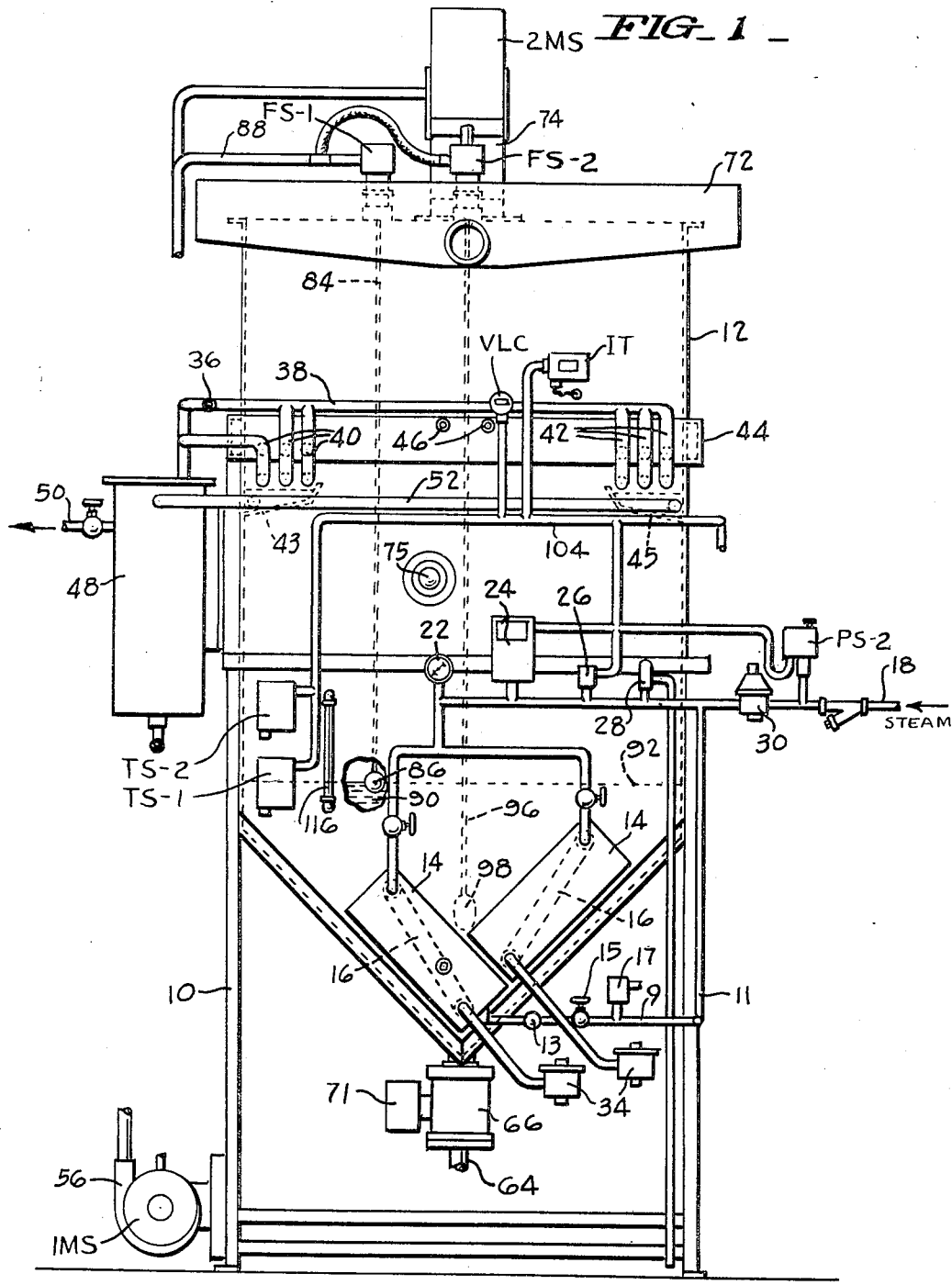
FIG_1
INVENTOR.
Bruce A. Young,
BY
Paul & Paul
ATTORNEYS.

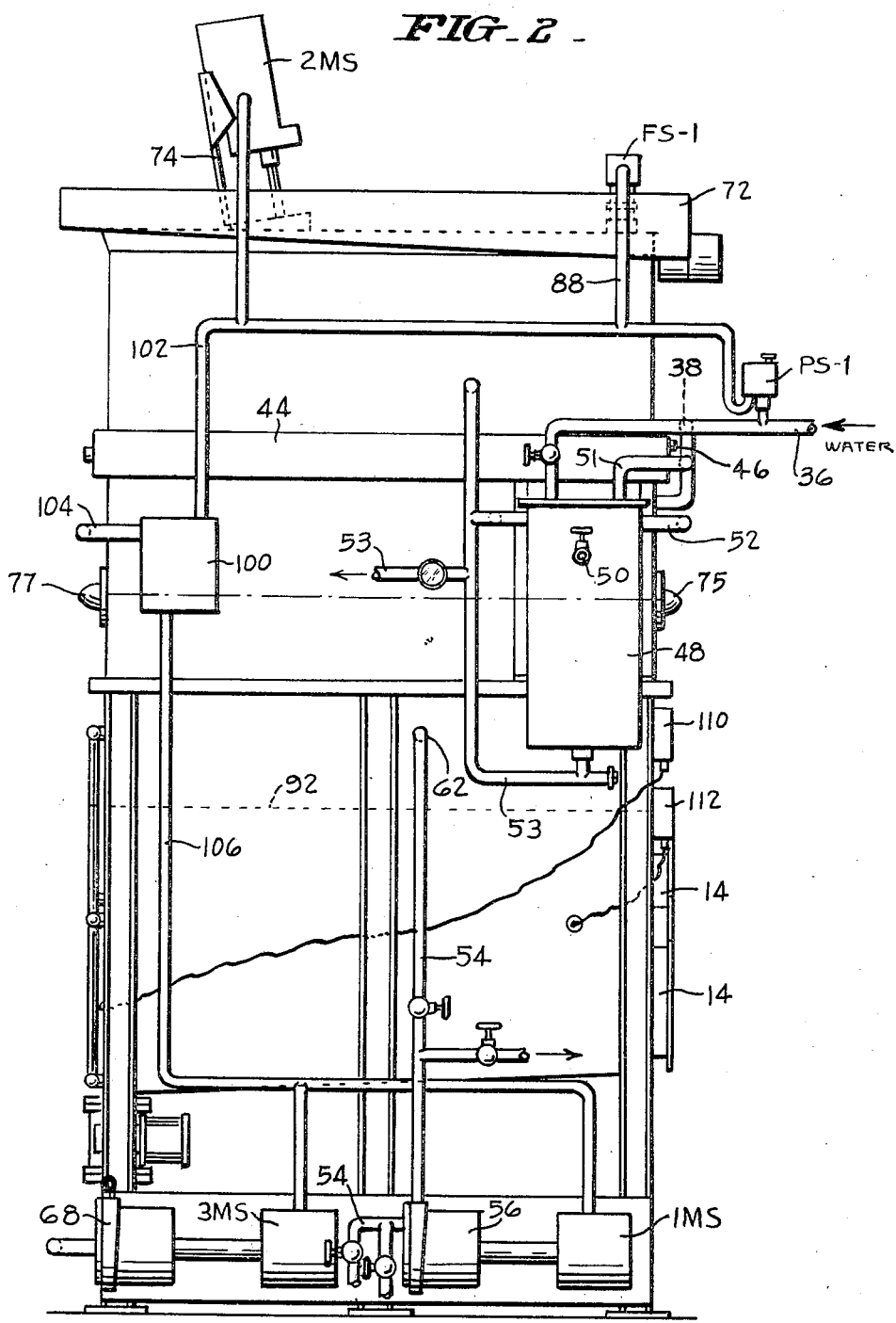

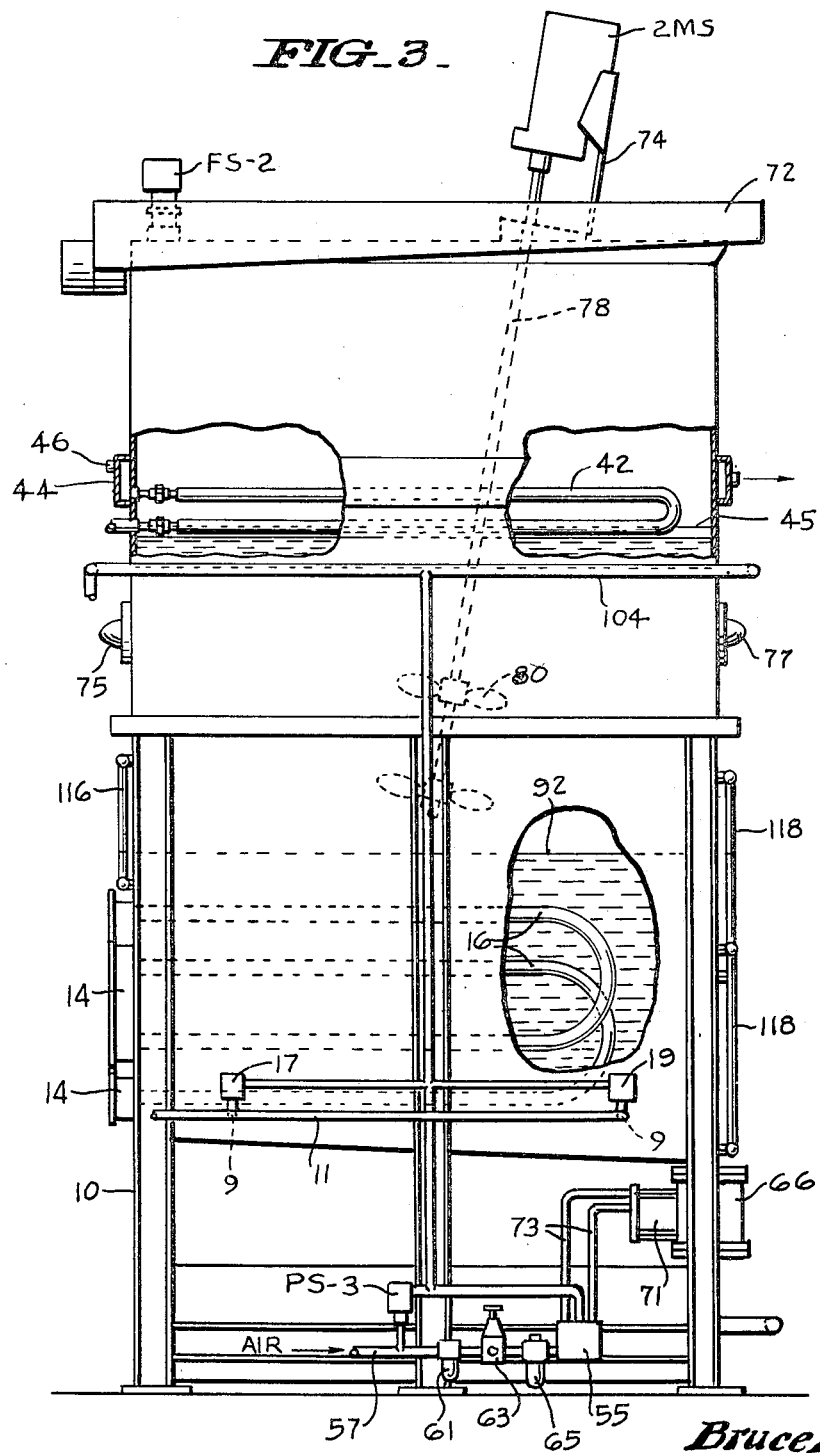

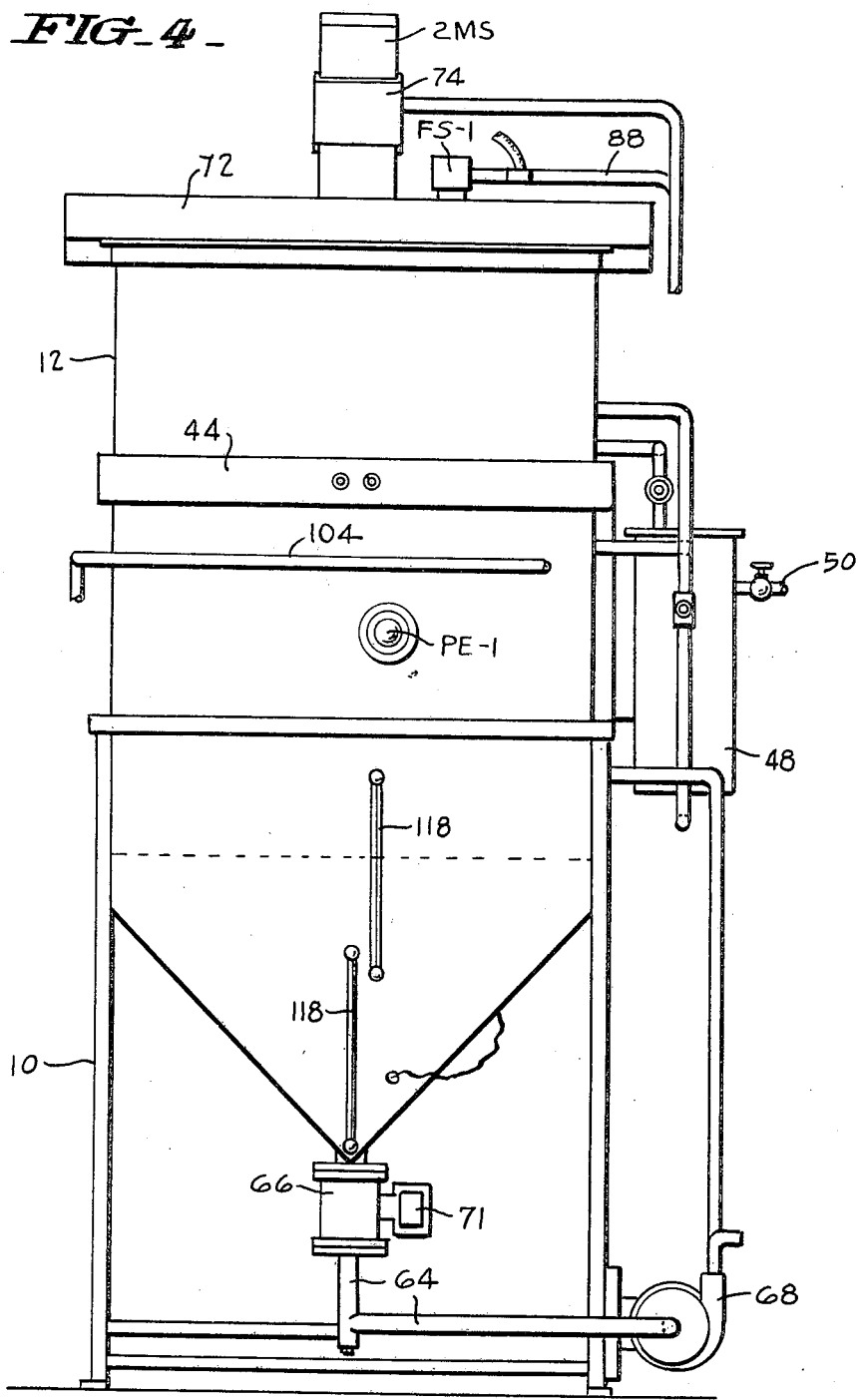

Dec. 9, 1969   B. A. YOUNG   3,483,092
RECOVERY OF A VOLATILE ORGANIC SOLVENT BY DISTILLATION
WITH SOLVENT FEED FLOW RESPONSIVE TO
STILL TEMPERATURE
Filed Dec. 19, 1966   6 Sheets-Sheet 5
FIG_5_
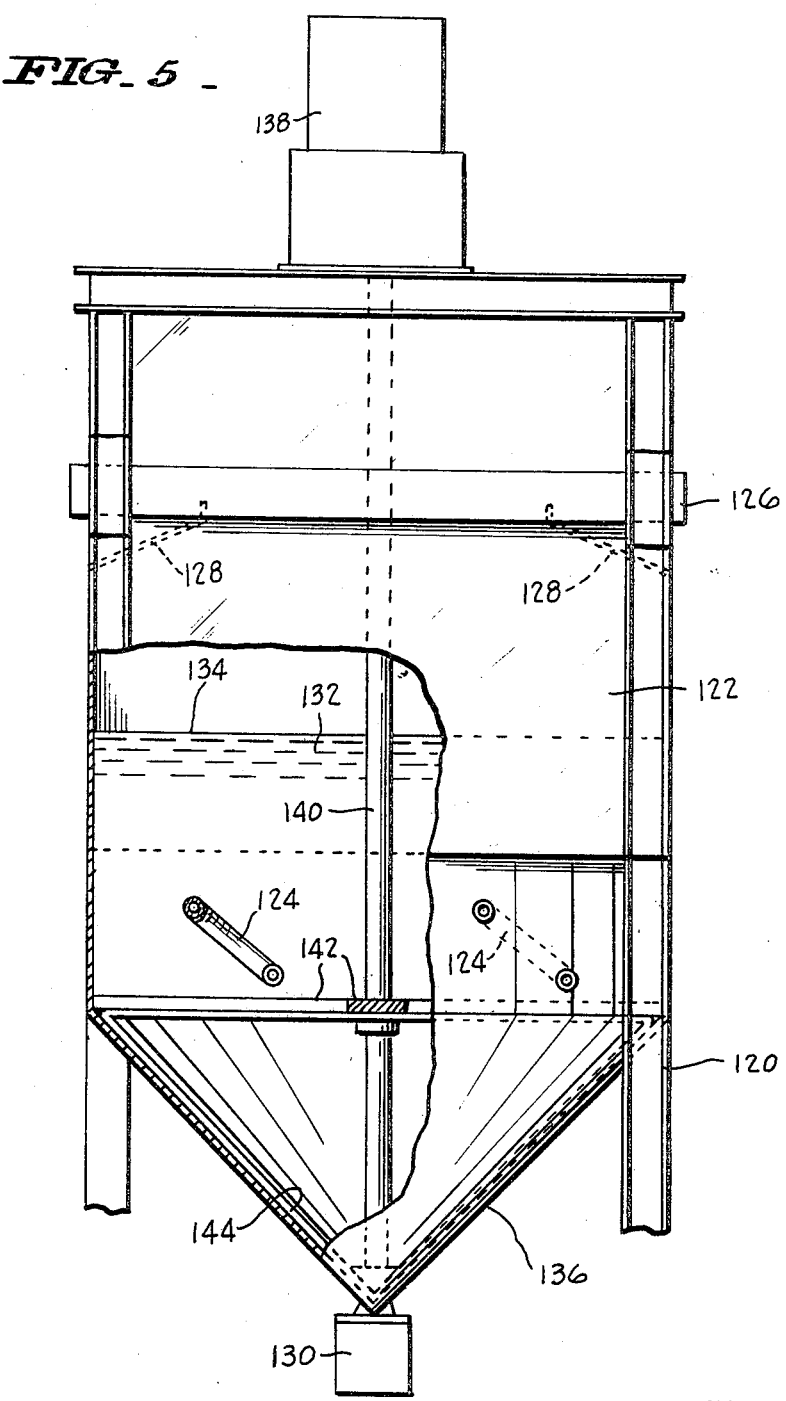
INVENTOR.
Bruce A. Young,
BY
Paul & Paul
ATTORNEYS.

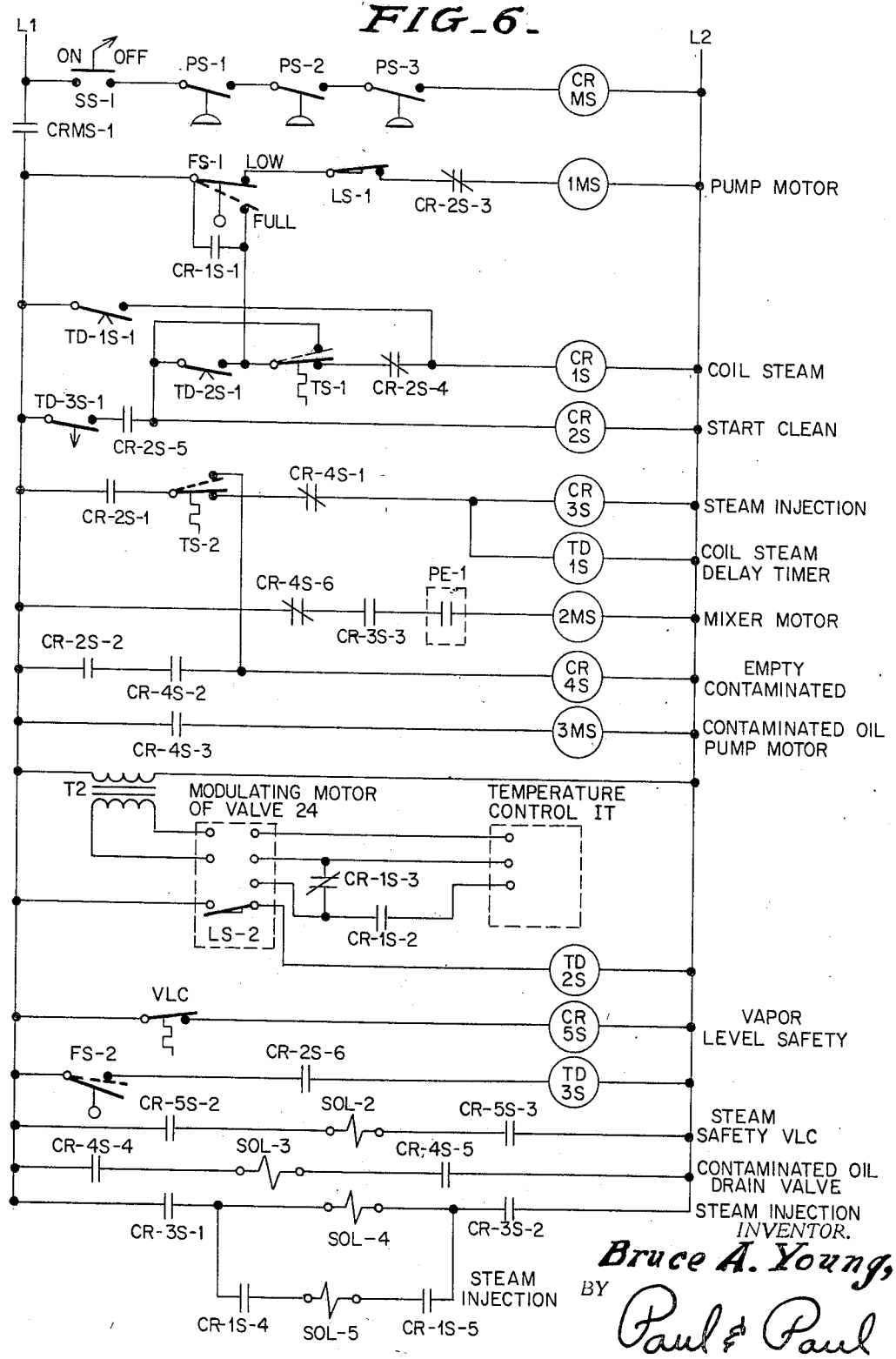

United States Patent Office 3,483,092
Patented Dec. 9, 1969

3,483,092
RECOVERY OF A VOLATILE ORGANIC SOLVENT BY DISTILLATION WITH SOLVENT FEED FLOW RESPONSIVE TO STILL TEMPERATURE
Bruce A. Young, Lathrup Village, Mich., assignor to Detrex Chemical Industries, Inc., Detroit, Mich., a corporation of Michigan
Filed Dec. 19, 1966, Ser. No. 602,784
Int. Cl. B01d 3/42
U.S. Cl. 203—1                                6 Claims

ABSTRACT OF THE DISCLOSURE

Apparatus and method for distilling contaminated liquid mixtures is described in which a repeating cycle is employed comprising the feeding of contaminated solvent mixture, distillation of the solvent mixture while the feeding is continued, sensing a decrease in distillation rate, discontinuing the solvent feed in response to the distillation rate decrease while continuing the heating and distilling, injecting steam directly into the solvent mixture, discharging the dregs and then repeating the cycle by reestablishing the solvent feed.

---

This invention relates generally to a process for the industrial degreasing of solvents, and to apparatus for practicing the process.

Industrial degreasing systems employing volatile cleaning solvents and adapted to be used for removing soluble and insoluble liquid and solid soils from a workpiece and transferring the same to the cleaning solvent are known. This cleaning solvent, being expensive, must be used over and over again. However, each time the cleaning solvent is used, the soils must be removed therefrom before it can be reused. Preferably, this is done by distillation.

The stills ordinarily used in industrial degreasing systems which utilize a cleaning solvent such as trichlorethylene are of the atmospheric type. The soils encountered ordinarily have a higher boiling point than the cleaning solvent, and therefore it is the cleaning solvent which is vaporized in the still. The soils accumulate in the boil chamber until they are present in sufficient quantities to raise the boiling point of the fluid mixture of cleaning solvent and soils to such a high value that the distillation rate is greatly reduced. At this point, steam is injected directly into the fluid mixture. This relowers the boiling point and steps up the distillation rate. When the fluid mixture has been stripped of practically all the cleaning solvent, the soils or dregs are drained from the still, which is then placed "on stream" again. The stream injecting and dreg draining operations and the operation of placing the still "on stream" again are manual operations, and it has heretofore been the duty of the operator not only to carry out these operations, but also to determine when to initiate them. It would, of course, be advantageous to relieve the operator of these duties. Accordingly, it is a principal object of the invention to provide for fully continuous operation of a solvent degreasing still, including the step of automatically placing the still "on stream" again after the fluid mixture of cleaning solvent and soils has been stripped of cleaning solvent and the dregs drained from the still.

In industrial installations, the type of soils introduced into the cleaning solvent may cause undesirable foaming. Heretofore, to control foaming, the heat input to the boil chamber has been reduced or a cold solvent spray has been directed toward the surface of the fluid mixture in the boil chamber. Neither of these expedients is desirable because they materially reduce the distillation rate. Accordingly, another object of the invention is to provide for foam control without reducing the distillation rate.

Another object of the invention is to provide the still with means for scraping the dregs from the bottom of the still to facilitate removal thereof from the still.

Other objects of the invention will become apparent when the following description is read with reference to the accompanying drawings, in which:

FIGURE 1 is a front elevation of a still constructed in accordance with the invention;
FIGURE 2 is a side elevation of the still shown in FIGURE 1;
FIGURE 3 is the opposite side view of the still shown in FIGURE 1, with parts broken away to expose details;
FIGURE 4 is a rear elevation of the still shown in FIGURE 1;
FIGURE 5 is a front elevation of a modified form of the still, with parts broken away to expose details; and
FIGURE 6 is a wiring diagram.

The following description is directed to the specific forms of the still shown in the drawings. It is not addressed to the scope of the invention, which may be practiced in a variety of forms.

Referring particularly to FIGURES 1 to 4, a floor supported frame 10 carries the body of the still, generally designated 12. The front of the still is provided with a pair of doors 14. Associated with the doors 14 are a pair of steam coils 16. A steam supply line 18 is provided with valved branches connected to the upper ends of the coils 16. The line 18 is provided with a pressure gauge 22, a steam flow control valve 24, a solenoid valve 26, a safety pop-off valve 28, a steam pressure reducer 30 and a steam pressure operated switch PS2. Connected to the lower ends of the coils 16 are steam traps, designated 34.

An extension of the line 18, designated 11, depends therefrom and is provided with a pair of branches 9 connected to the bottom of the still. Each branch has connected therein a check valve 13 and a gate valve 15. A solenoid valve 17 is connected in one branch and a solenoid valve 19 is connected in the other branch.

A line 36 for supplying cooling water is connected to a manifold 38 and has connected therein a water pressure operated switch PS-1. Connected to the manifold 38 are a set of condensing coils 40 and a set of condensing coils 42 respectively located over a pair of condensate trays 43 and 45. The coils 40 and 42 communicate with a water jacket 44 which is provided with water outlet connections 46. The water supply line 36 is also connected to the top of a conventional water separator, designated 48. The water is discharged from the separator through a conduit 51. Condensate which collects in the trays 43 and 45 is conducted through line 52 to the separator 48, which separates the water from the solvent. The solvent is discharged through the conduit 53. Water separated from the solvent is discharged through an outlet 50.

Solvent from the degreaser flows through a valved line 54, being pumped by a pump 56 actuated by an electric motor 1MS. The line 54 is connected to the still, as at 62.

A sludge line 64 provided with a valve 66 is connected to the bottom of the still. Connected to the sludge line 64 is a pump 68 actuated by an electric motor 3MS. The valve 66 is actuated by an air cylinder 71, from which two conduits 73 extend to a four-way solenoid valve 55 connected in an air supply line 57. Also connected in the line 57 is an air pressure switch PS-3, an air filter 61, an air regulator 63 and and an oiler 65.

Extending over the open top of the still is a vent duct, designated 72.

Suitably supported at the top of the still is a bracket 74 carrying a mixer motor 2MS from which there extends downwardly into the still a shaft 78 carrying a set of mixer blades 80.

A float switch FS-1 located at the top of the still has a cable 84 depending therefrom and carrying a float 86 floating in the mixture 90 of cleaning solvent and soils at a level 92. A float switch FS-2 also located at the top of the still has a cable 96 depending therefrom and carrying a float 98 at a substantially lower level than the float 86.

Extending from a terminal box, designated 100, are conduits 102, 104 and 106. The conduit 102 contains conductors leading to the mixer motor 2MS, float switches FS-1 and FS-2 and water pressure operated switch PS-1. The conduit 104 contains conductors leading to solenoid valves 17 and 19, four-way solenoid valve 55, air pressure switch PS-3, steam flow control valve 24, solenoid valve 26, steam pressure operated switch PS-2, temperature controllers IT, TS-2 and TS-1 and vapor level controller VLC. The conduit 106 contains conductors leading to the pump motors 1MS and 3MS. All of the instruments mentioned hereinabove are connected in a suitable electrical circuit, to be described hereinafter.

The still is suitably provided with liquid level gauges, i.e., gauge 116 on the front wall thereof and gauges 118 on the rear wall thereof.

Cooling water is introduced through line 36 to the manifold 38. Water from the manifold circulates through the coils 40 and 42 and then passes into the jacket 44, being discharged from the jacket through the connections 46.

Solvent from the degreaser is pumped by the pump 56 through the line 54 into the boil chamber via the connection 62. The mixture of cleaning solvent and soils, designated 90, rises in the boil chamber to a predetermined level 92. Normally, this level is maintained by switch FS-1, which responds to movements of the float 86 and causes the pump 56 to operate periodically.

Steam is introduced through the line 18 to the coils 16 and circulates through the coils for boiling the mixture of solvent and soils. Steam is also introduced through the extension 11 of the line 18 and the branches 9 of the extension 11 directly into the bottom of the boil chamber for the stripping operation.

Distillation at rated capacity is maintained by the sensitive bulb of the temperature controller IT, which controls. The condensate collects on the trays 43 and 45 and is drawn off to the separator 48 through line 52. Solvent is discharged from the separator through the conduit 53, and the water separated from the solvent is discharged from the water separated from the solvent is discharged from the separator through the outlet 50. When the percentage of soils in the fluid mixture raises the boiling point of the mixture, the distillation rate decreases. The high temperature is sensed by the sensitive bulb of temperature controller TS-1. At a predetermined high temperature the temperature controller TS-1 deactivates the float switch FS-1, whereupon infeed of the mixture of cleaning solvent and soils is terminated. Distillation continues until the fluid in the boil chamber is at a predetermined lower level.

Duration of the distillation cycle, after infeed is discontinued, is controlled by the sensitive bulb of temperature controller TS-2, which activates solenoid valve 17 when only approximately 15 percent of the volume of the fluid mixture is solvent. Thereupon, steam at approximately 15 p.s.i.g. is injected into the boiling fluid. At the same time, steam to the coils 16 is cut off.

About five minutes later, by means of a time delay device, designated TD-1S, steam is returned to coils 16, and solenoid valve 19 is opened, increasing the rate of steam flow. Thus the boiling point of the mixture is reduced.

Direct steam injection and steam coil distillation continue until a predetermined temperature is reached. The temperature controller TS-2 senses the temperature and closes valves 17, 19 and 24, thus terminating the stripping cycle.

Excessive foaming is detected by the photo-electric cell PE-1 receiving light from the source 75. When the foam interrupts the beam of light, the mixer motor 2MS is energized, and the blades 80 rotate to break up the surface condition causing the foaming.

The four-way solenoid valve 55 now operates for supplying air through one of the lines 73 for actuating the air cylinder 71, whereupon the drain valve 66 is opened and the motor 3MS energized. Thereupon, the pump 68 pumps the dregs from the boil chamber to an outside closed container (not shown). The switch FS-2 responds to movements of the float 98 and senses the empty condition of the still. After a timer TD-3S times out, the still returns to normal operation, automatically starting a new cycle.

Now referring particularly to FIGURE 5, the modified form of the still includes a frame 120 supporting a still body 122 containing steam coils 124. Extending about the body 122 is a water jacket 126 and on the inside of the body 122 are a pair of condensate trays 128. Extending from the bottom of the still is a drain valve 130. The fluid mixture of cleaning solvent and soils, designated 132, is maintained at a predetermined level 134.

The still body 122 is provided with a conical bottom 136. A motor reducer 138 is suitably supported at the top of the still. Depending from the motor reducer 138 is a shaft 140 journaled in a spider 142. The lower extremity of the shaft 140 mounts a scraper blade 144.

It is advantageous to use a scraper blade 144 when the residue is very viscous or high in solid content. Draining of the dregs is facilitated thereby.

As indicated hereinbefore, when the percentage of soils, in the mixture of cleaning solvent and soils rises, the temperature is elevated and the distillation rate decreases. The temperature change may be sensed by the sensitive bulb of temperature controller TS-1, as stated, or alternately the reduced rate of flow may be sensed by a flow meter (not shown) in the condensate return line 53.

As indicated hereinbefore, at a predetermined high temperature (225° F. when the solvent is trichlorethylene) the temperature controller TS-1 deactivates the float switch FS-1, whereupon infeed of the mixture of cleaning solvent and soils is terminated. Alternately, the float switch FS-1 may be deactivated when the distillation rate is about 30 percent of rated capacity.

It has been stated that direct steam injection and steam coil distillation continue until temperature controller TS-2 senses a predetermined temperature (approximately 250° F. for trichlorethylene, at which temperature approximately 15 percent of the mixture of cleaning solvent and soils is solvent). Alternately, an adjustable timer (not shown) may be used.

Referring to FIGURE 6, the electric circuit is shown in the condition thereof when the apparatus is at rest. Electric power is supplied through line L1–L2. When the key switch SS-1 is closed, the control relay CRMS is energized (provided adequate water, steam and air pressures are available to close the pressure switches PS-1 PS-2 and PS-3). Thereupon, the contacts CRMS-1 close, energizing the primary of transformer T2. Through float controlled switch FS-1, limit switch LS-1 (closed when drain valve 66 is closed) and contacts CR-2S-3 pump motor 1MS is energized and pump 56 fills the still to predetermined level 92, whereupon switch FS-1 transfers, deenergizing pump motor 1MS. Through switch FS-1, temperature controller TS-1 and contacts CR-2S-4, control relay CR-1S is energized. This closes the contacts CR-1S-1, locking the control relay. Simultaneously, contacts CR-1S-2 close and contacts CR-1S-3 open. Thereupon, temperature controller IT places the modulating motor of valve 24 in operation and steam is supplied to coils 16 as required to maintain vapor level. Boiling and condensation gradually lower the level of fluid mixture in the still, and eventually a predetermined low level is reached, whereupon switch FS-1 transfers again and the fill cycle repeats.

Through CRMS-1 and vapor level controller VLC control relay CR-5S is energized. If, for any reason, the vapor rises to a predetermined high level, controller VLC transfers, deenergizing control relay CR–5S, whereupon, through CR–5S–2 and CR–5S–3, the solenoid 2 of valve 26 will be energized, shutting off main steam input.

When the boiling point of the fluid mixture in the still reaches a temperature of approximately 225° F., measured by temperature controller TS–1, TS–1 transfers, energizing control relay CR–2S and starting the clean cycle. Through FS-2, which is closed when the fluid mixture in the still is high, and CR–2S–6 delay timer TD–3S is energized, and through TD–3S–1 and CR–2S–5, control relay CR–2S is locked.

If, during still operation, steam requirement is such that the modulating motor moves valve 24 to fully open position, LS–2 is closed, energizing delay timer TD–2S. If, after a predetermined time, the temperature of the fluid mixture does not reach 225° F. to satisfy temperature controller TS–1, TD–2S times out and through TD–2S–1 control relay CR2S is energized. Thus the clean cycle is started. Control relay CR2S is locked as indicated above.

When control relay CR2S is energized, contacts CR–2S–4 open, deenergizing control relay CR–1S and cutting off the supply of steam to coils 16. At the same time, contacts CR–2S–3 open, deenergizing control relay 1MS and terminating infeed of the fluid mixture. Through CR–2S–1, TS–2 and CR–4S–1 control relay CR–3S and delay timer TD–1S are energized, and through CR–3S–1 and CR–3S–2 the solenoid 4 of valve 17 is energized, whereupon steam is injected to aid distillation.

When the timer TD–1S times out, control relay CR–1S is reenergized through TD–1S–1 and steam is again applied to the coils. In addition, through CR–3S–1, CR–1S–4, CR–1S–5 and CR–3S–2 solenoid 5 of valve 19 is energized, increasing steam injection. When distillation is complete, temperature controller TS–2 transfers, deenergizing control relay CR–3S and delay timer TD–1S. As a result, TD–1S–1 transfers. Thus coil steam is cut off and solenoids 4 and 5 of valves 17 and 19 respectively are deenergized.

Through contacts CR–2S–1 and temperature controller TS–2 the control relay CR–4S is energized, whereupon contacts CR–4S–3 close and energize the motor 3MS of the contaminated oil pump 68, which pumps contaminated oil to a storage tank. When the contaminate reaches a predetermined low level, sensed by the float of switch FS–2, FS–2 transfers and deenergizes delay timer TD3S. Through TD3S–1 and CR–2S–5 the control relay CR2S is deenergized. Through CR–2S–2 and CR–4S–2 the control relay CR4S is deenergized. Through CR–4S–4 and CR–4S–5 solenoid 3 is deenergized, closing drain valve. The drain valve closes LS–1. Through CR–4S–3 contaminated oil pump motor 3MS is deenergized. Through FS–1 solvent pump motor 1MS is reenergized and refills the still, restarting the cycle.

If the mixture froths, the condition is sensed by the photoelectric cell PE–1, whereupon mixer motor 2MS is energized through contacts CR–4S–6, CR–3S–3 and PE–1.

What is claimed is:

1. A method of recovering a volatile organic solvent from a contaminated solvent mixture containing dissolved and undissolved soils, comprising the steps of feeding said contaminated solvent to a still, heating the solvent in said still to a temperature corresponding to the boiling point of the solvent mixture, condensing the solvent vapors thus produced to a liquid distillate, removing the distillate while continuing said solvent feed, sensing an increase to a pre-selected temperature in said contaminated solvent in said still, discontinuing the solvent feed in response to said increase to said pre-selected temperature, injecting steam directly into said solvent mixture, discontinuing said steam injection, discharging the dregs remaining in the still and then repeating the cycle of operation by reestablishing said solvent feed.

2. The method of claim 1 further characterized by the steps of sensing an increase in temperature of the liquid solvent in the still to a second pre-selected temperature above the solvent temperature at which the solvent feed is discontinued, and initiating the injection of steam in response to the sensed increase in temperature to said second pre-selected temperature.

3. The method of claim 1 in which the discharge of dregs is initiated at the time steam injection is discontinued.

4. The method of claim 1 further characterized by the steps of sensing a drop in the solvent liquid level to a predetermined value and reestablishing the solvent feed response to said drop.

5. The method of claim 1 further characterized by the step of sensing an increase in temperature of said contaminated solvent in said still body and in response to said increase, increasing the rate of heating of said solvent.

6. The method of claim 2 further characterized by the step of sensing an increase in the temperature of the contaminated solvent in the still body to a third pre-selected temperature above said second pre-selected temperature at which said steam injection is initiated, and discontinuing said steam injection in response to the sensed increase to said third pre-selected temperature.

References Cited

UNITED STATES PATENTS

| | | | |
|---|---|---|---|
| 2,140,623 | 12/1938 | Hetzer | 202—181 |
| 2,240,952 | 5/1941 | Hetzer | 202—206 XR |
| 2,332,800 | 10/1943 | Killough | 134—30 |
| 2,441,361 | 5/1948 | Kirgan | 203—1 |
| 2,593,640 | 4/1952 | Whittington | 202—206 |
| 2,801,958 | 8/1957 | Farkenbacher et al. | 202—170 |
| 3,089,250 | 5/1963 | Victor | 202—233 |
| 3,094,468 | 6/1963 | Topham | 202—206 |
| 3,266,273 | 8/1966 | Pranovi | 202—160 |

WILBUR L. BASCOMB, JR., Primary Examiner

U.S. Cl. X.R.

203—2, 4, 96; 202—160, 206, 164, 168, 1.81, 233, 241; 134—30

PO-1050
(5/69)

UNITED STATES PATENT OFFICE
CERTIFICATE OF CORRECTION

Patent No. 3,483,092      Dated December 9, 1969

Inventor(s) Bruce A. Young

It is certified that error appears in the above-identified patent and that said Letters Patent are hereby corrected as shown below:

Column 1, line 52, "stream injecting" should read --steam injecting--.
Column 3, line 41, after "con-" insert --trols the valve 24 and thereby the rate of steam flow. Vapors rise and condense upon contact with coils 40 and 42.--
Column 3, line 45 "from" (second occurrence) should be deleted (a repetition).
Column 3, line 46 "the water separated from the solvent is discharged" (a repetition).

SIGNED AND
SEALED
JUN 2 1970

(SEAL)
Attest:

Edward M. Fletcher, Jr.
Attesting Officer

WILLIAM E. SCHUYLER, JR.
Commissioner of Patents